United States Patent [19]

Stachowiak et al.

[11] 4,335,801

[45] Jun. 22, 1982

[54] NOISE SUPPRESSING NOZZLE

[75] Inventors: Claude R. Stachowiak, Renton; Fred R. Kunze, Bellevue, both of Wash.

[73] Assignee: The Boeing Company, Seattle, Wash.

[21] Appl. No.: 216,285

[22] Filed: Dec. 15, 1980

[51] Int. Cl.³ .......................... F01N 1/14; F02K 1/00
[52] U.S. Cl. ..................................... 181/213; 181/220
[58] Field of Search .............. 181/213, 217, 218, 220, 181/222, 214, 215, 216, 219, 221; 60/226 R–226 B, 262, 264, 317

[56] References Cited

U.S. PATENT DOCUMENTS

| | | | |
|---|---|---|---|
| 2,565,308 | 8/1951 | Hottel et al. | 60/44 |
| 3,053,340 | 9/1962 | Kutney | 181/220 |
| 3,084,505 | 4/1963 | Cherchi | 60/55.6 |
| 3,092,205 | 6/1963 | Brown et al. | 181/213 |
| 3,508,403 | 4/1970 | Neitzel | 60/226 |
| 3,568,794 | 3/1971 | Hilbig | 181/51 |
| 3,647,021 | 3/1972 | Millman | 181/220 |
| 4,117,671 | 10/1978 | Neal | 60/262 |

FOREIGN PATENT DOCUMENTS 920328 3/1963 United Kingdom .

Primary Examiner—L. T. Hix
Assistant Examiner—Benjamin R. Fuller
Attorney, Agent, or Firm—Delbert J. Barnard; Eugene O. Heberer; Joan H. Pauly

[57] ABSTRACT

Wall deflections of a multi-lobe type noise suppressing nozzle are minimized without the use of external struts and by the use of only a single internal strut per lobe. The lobes have either a substantially elliptical or substantially circular shape in cross section and they merge into valley regions of substantially circular curvature in cross section. The internal struts and thickened sidewall portions of the lobes define a structural ring providing hoop and bending strength at the center of the nozzle. The thickened sidewall sections of the lobes are welded to shaped sheet metal crown and forward valley sections to form the nozzle. Wall portions of the nozzle are thinned by the chemical milling for the purpose of weight reduction.

26 Claims, 8 Drawing Figures

NOISE SUPPRESSING NOZZLE

BACKGROUND OF THE INVENTION

1. Field of the Invention

This invention relates to noise suppressing nozzles for subsonic jet engines, and in particular to the provision of an improved multi-lobe noise suppressing nozzle characterized by a construction which minimizes propulsive losses due to lobe wall deflection while improving engine performance and decreasing external aerodynamic drag and nozzle weight.

DESCRIPTION OF THE PRIOR ART

The noise suppressing nozzle disclosed by U.S. Pat. No. 3,092,205, granted June 4, 1963, to David M. Brown, John M. S. Keen, and Bertram H. Urmston, is typical of the multi-lobe exhaust nozzles which are in actual use today. Nozzles of this type experience high propulsive losses due to the shape of the lobes, and in particular due to the generally straight nature of the sidewalls, causing such walls to deflect in response to the pressure and temperature increases encountered during use. Nozzles of this type are known to experience an exit area change greater than 0.5% between takeoff and cruise engine power settings of the aircraft even though they utilize a large number of struts and other structure in an effort to stabilize the lobe sidewalls. The use of such structure further decreases engine performance, increases aerodynamic drag, and provides a severe weight penalty.

A principal object of the present invention is to provide a multi-lobe noise suppressing nozzle that is characterized by a lobe cross-sectional shape and a wall construction which solves the performance loss problem associated with pressure and temperature deflections of the lobes, and which requires the use of a very minimal amount of internal strut structural reinforcement and no external reinforcement.

Other multi-lobe nozzle configurations in the patent literature are disclosed by the following patents: U.S. Pat. No. 2,565,308 granted Aug. 21, 1951, to Hoyt C. Hottel and Glenn C. Williams; U.S. Pat. No. 3,053,340, granted Sept. 11, 1962, to John T. Kutney; U.S. Pat. No. 3,508,403, granted Apr. 28, 1970, to Robert E. Neitzel; U.S. Pat. No. 3,568,794, granted Mar. 9, 1971, to Jack H. Hilbig; U.S. Pat. No. 3,084,505, granted Apr. 9, 1963, to Robert A. Cherchi; U.S. Pat. No. 3,647,021, granted Mar. 7, 1972, to Victor Millman and Wallie T. Gray; U.S. Pat. No. 4,117,671, granted Oct. 3, 1978, to Brian Neal and Lars Q. Anderson and British Pat. No. 920,328, granted Mar. 6, 1963, to Dennis B. Leason and Arthur F. Farr.

BRIEF DESCRIPTION OF DRAWING FIGURES

Referring to the drawing wherein like reference characters designate like parts throughout the several views.

SUMMARY OF THE INVENTION

Figure 1:
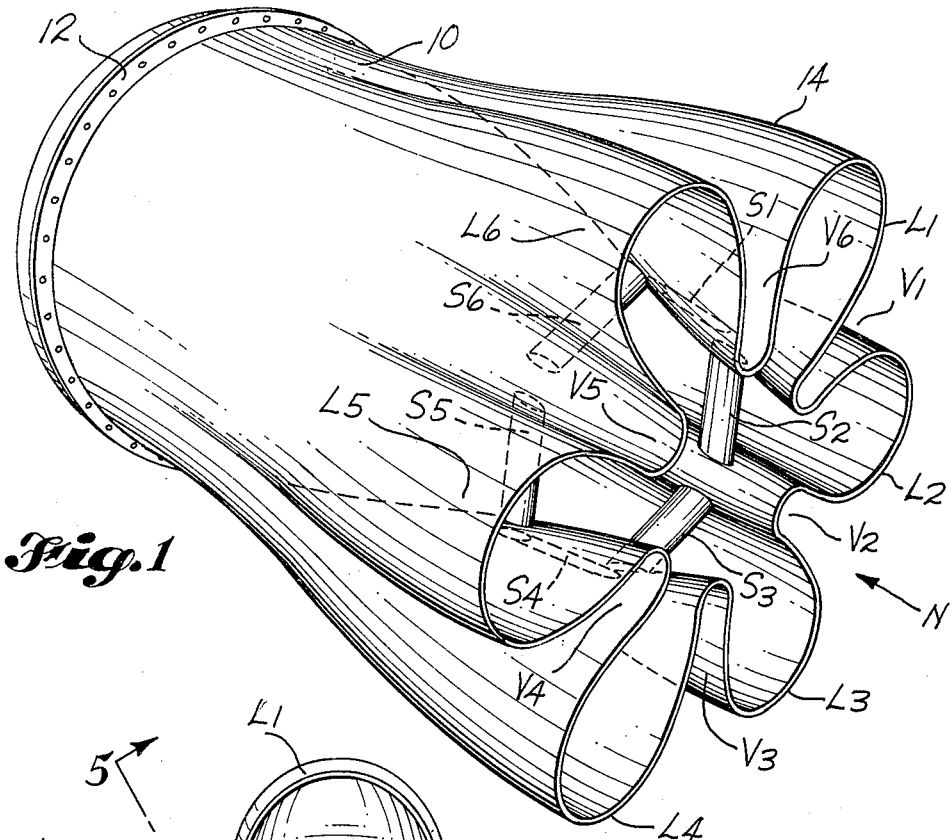
FIG. 1 is a pictorial view, looking from above and toward the outlet end and one side of a noise suppressing nozzle for a jet engine, embodying the present invention.

A principal object of the present invention is to provide a multi-lobe type noise suppressing nozzle which includes a unique ring structure for reinforcing the nozzle at its center. Such ring structure is for the most part composed of thickened sidewall portions of the lobes. Specifically, each lobe includes a thickened sidewall section on each of its sides. Each such section merges into and is welded to the adjacent thickened sidewall section of the adjoining lobe. Thus, the thickened sidewall sections of the lobes also help define thickened valley wall portions of the nozzle between adjacent lobes. The ring structure is completed by streamlined struts which span across the base portions of the lobes and interconnect the thickened wall sections. Only a single strut is used per lobe.

Only small struts are needed and performance loss is minimized by making the struts streamlined and aligning them with the hot gas flow. External struts are entirely eliminated, resulting in improved airflow through the passageways defined between the lobes attended by increased acoustical attenuation and minimal aerodynamic drag.

According to another aspect of the invention, the sidewalls of the lobes curved smoothly in the radial direction. They first diverge as they extend radially outward from the general vicinity of strut attachment, and then they converge and eventually merge. In preferred form, the nozzle comprises six lobes and each lobe is generally eliptical in cross section. However, another aspect of the invention is to provide such a nozzle in which each lobe is generally circular in cross section.

Another object of the invention is to provide a multi-lobe noise suppressing nozzle of composite construction. In such nozzle, in addition to its two thickened sidewall sections each lobe comprises a crown wall section and the nozzle further includes a forward valley section for each pair of lobes, positioned in the valley region between lobes axially forwardly of the joined together thickened sidewall sections for such lobes and radially inwardly of the crown wall sections for such lobes. All of the parts are welded together where they meet.

In preferred form, the crown wall sections and the forward valley sections are formed sheet metal shapes.

In accordance with another aspect of the invention, portions of the formed sheet metal shapes are reduced in thickness by milling (e.g. chemical milling) for the purpose of reducing the weight of the nozzle.

These and other objects, features and advantages of our noise suppressing nozzle will be apparent from the makeup of the preferred embodiments, described below in connection with the drawing.

DESCRIPTION OF THE PREFERRED EMBODIMENTS

Figure 2:
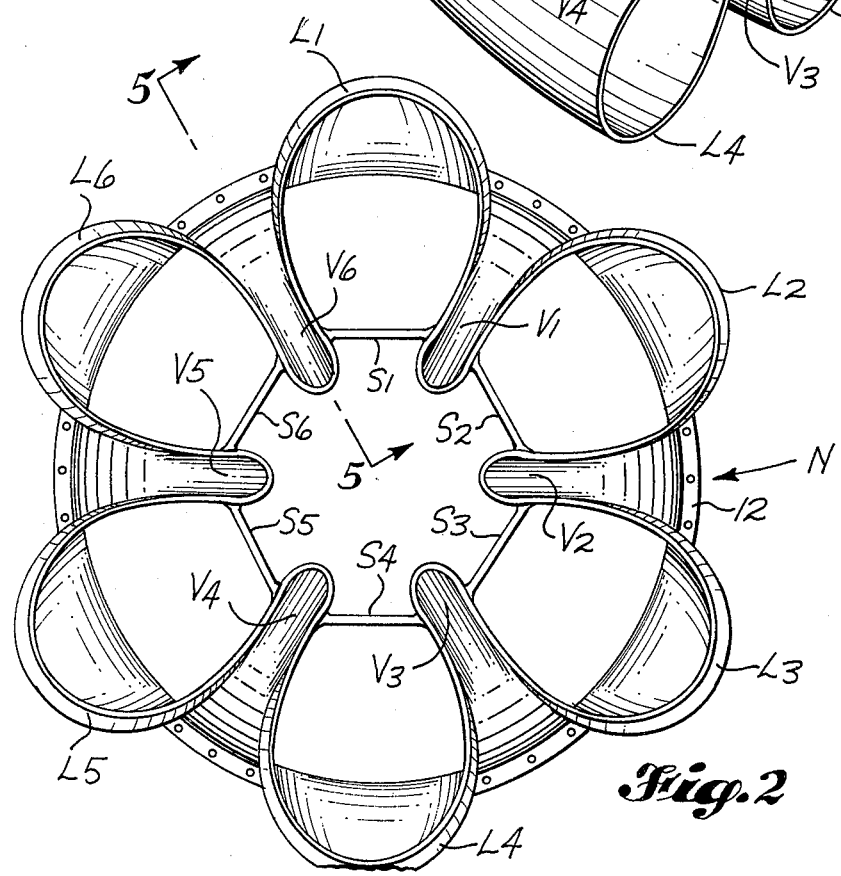
FIG. 2 is a rear elevational view looking toward the outlet of the nozzle.

As shown by FIGS. 1 and 2, nozzle N comprises a forward cylindrical section 10 which includes a radial flange 12 used for bolting the nozzle N to the after end of the engine housing or thrust reverser (not shown).

The after or mixing section 14 of nozzle N comprises a plurality of lobes L1-L6, each defining a channel like internal passageway for some of the hot gases which flow through the nozzle N. External passageways or valleys V1-V6 are defined by and between each adjacent pair of lobes L1-L6. Streams of ambient air are entrained into the valley passages V1-V6 by the gases discharging from nozzle N. The mixing which occurs between the hot gases and cold ambient air reduces the temperature and velocity gradient between the main jet stream and ambient air, to in this manner suppress noise.

Figure 4:
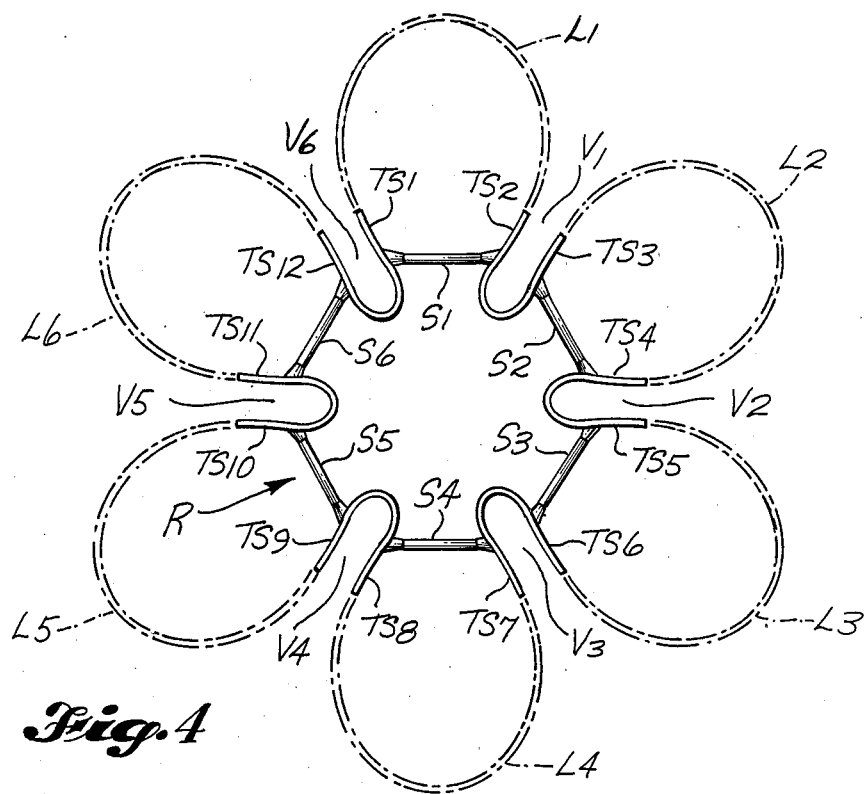
FIG. 4 is a view from the aspect of FIG. 2, but presenting a solid showing of the structural ring formed by the thickened sidewall sections of the lobes and the transverse reinforcement struts, and a broken line showing of the remaining parts of the nozzle.

According to an aspect of the present invention, nozzle N is of composite construction. As best shown by FIG. 4, the preferred embodiment comprises a ring structure R near its center spaced axially forwardly of the exit plane 16 (FIG. 5) of nozzle N. Ring structure R is composed of a plurality of thickened lobe sidewall sections TS1-TS12 and interconnecting internal struts S1-S6.

As best shown by FIGS. 3-6, each thickened wall section TS1-TS12 has a radial inner edge 18, 20 which extends along the longitudinal center line of a valley (e.g. valleys V6 and V1 in FIG. 6) and a radial outward edge 22, 24. Each section TS1-TS12 is thickened throughout a portion of the length of its edge 18, 20. Each edge 18 is welded to an edge 20 of the adjacent thickened sidewall section of the adjoining lobe. Thus, the two thickened sidewall sections existing in each valley, each of which is a mirror image of the other, are welded together where they meet along the center line of the valley and together define an outwardly opening U-shaped structure which is thickened at its middle, including along the weld line, and which tapers gradually from such thickened middle both forwardly and rearwardly in the axial direction and also radially outwardly, to boundaries which are of substantially the same thickness as the boundaries of some hereinafter to described sheet metal members to which the thickened sections TS1-TS12 are attached.

Figure 6:
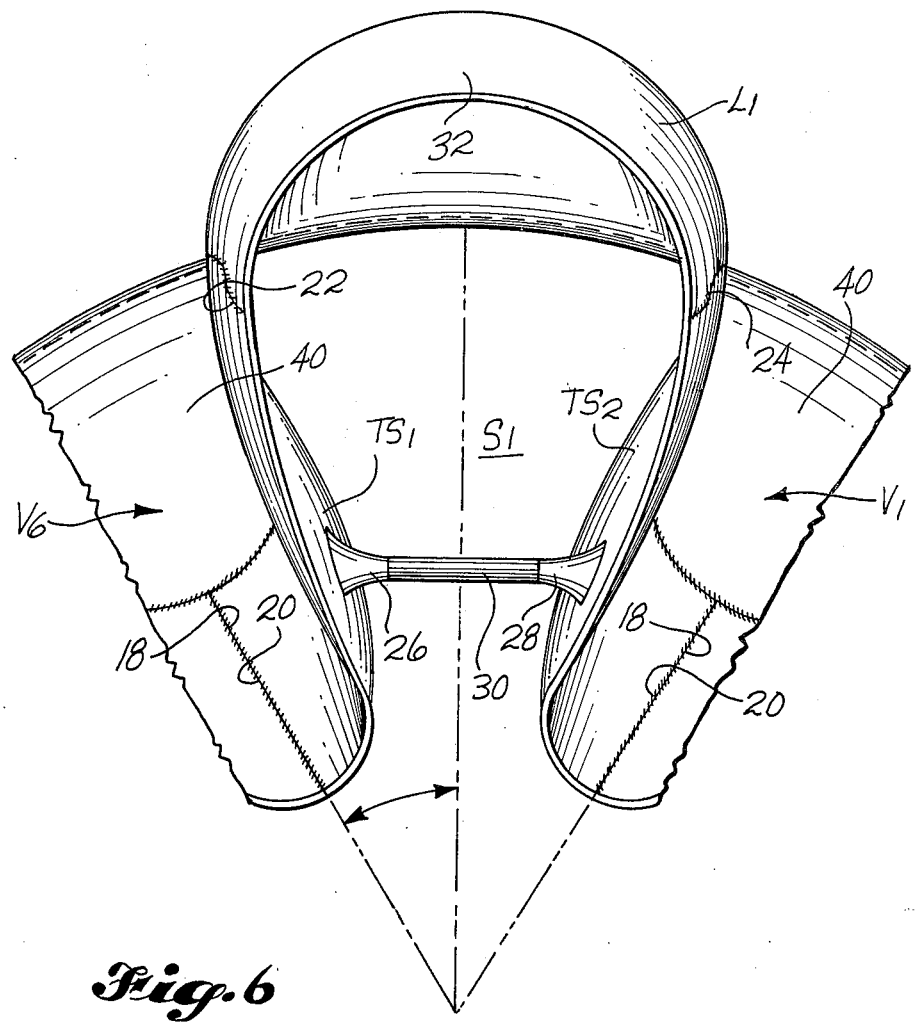
FIG. 6 is an enlarged scale rear elevational view of a fragmentary portion of the nozzle, including a complete lobe and portions of the two adjoining lobes, such view including a showing of weld joints and contour lines.
Figure 7:
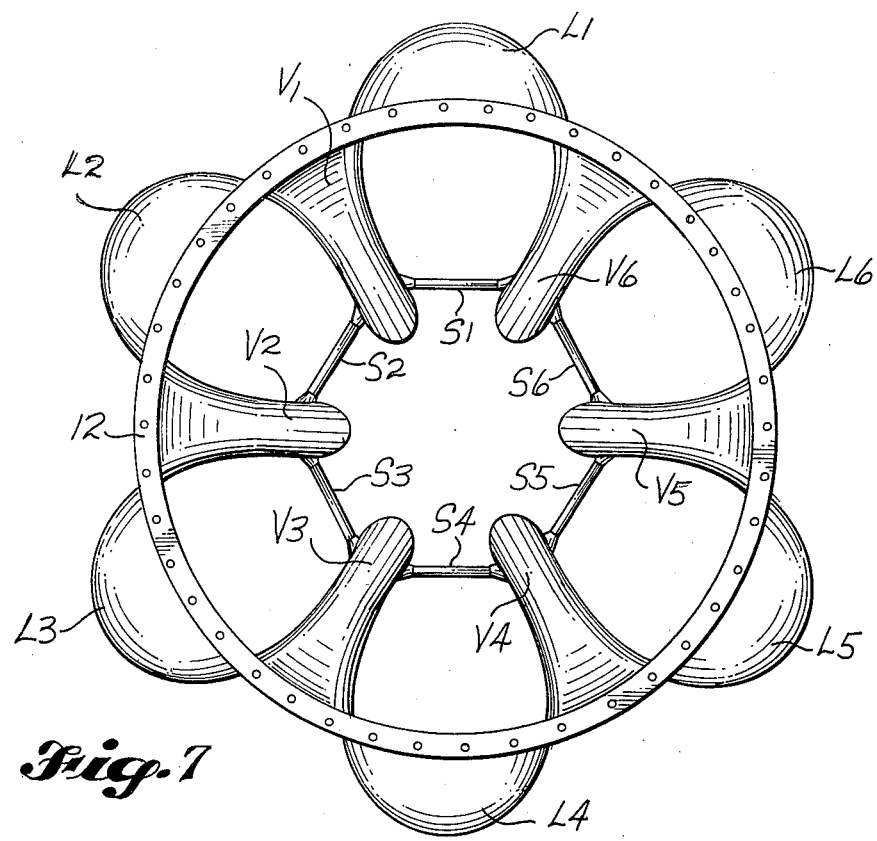
FIG. 7 is a front elevation view looking through the full nozzle.

Thickened wall sections TS1-TS12 are preferably formed to include short stub portions 26, 28 of the struts S1-S6. As best shown by FIG. 6, fillets exist between thickened base portions of the strut stubs 26, 28 and the thickened wall sections TS1-TS12 from which they extend. A strut completion section 30 is welded between the free ends of the stubs 26, 28, to complete the struts S1-S6.

Figure 5:
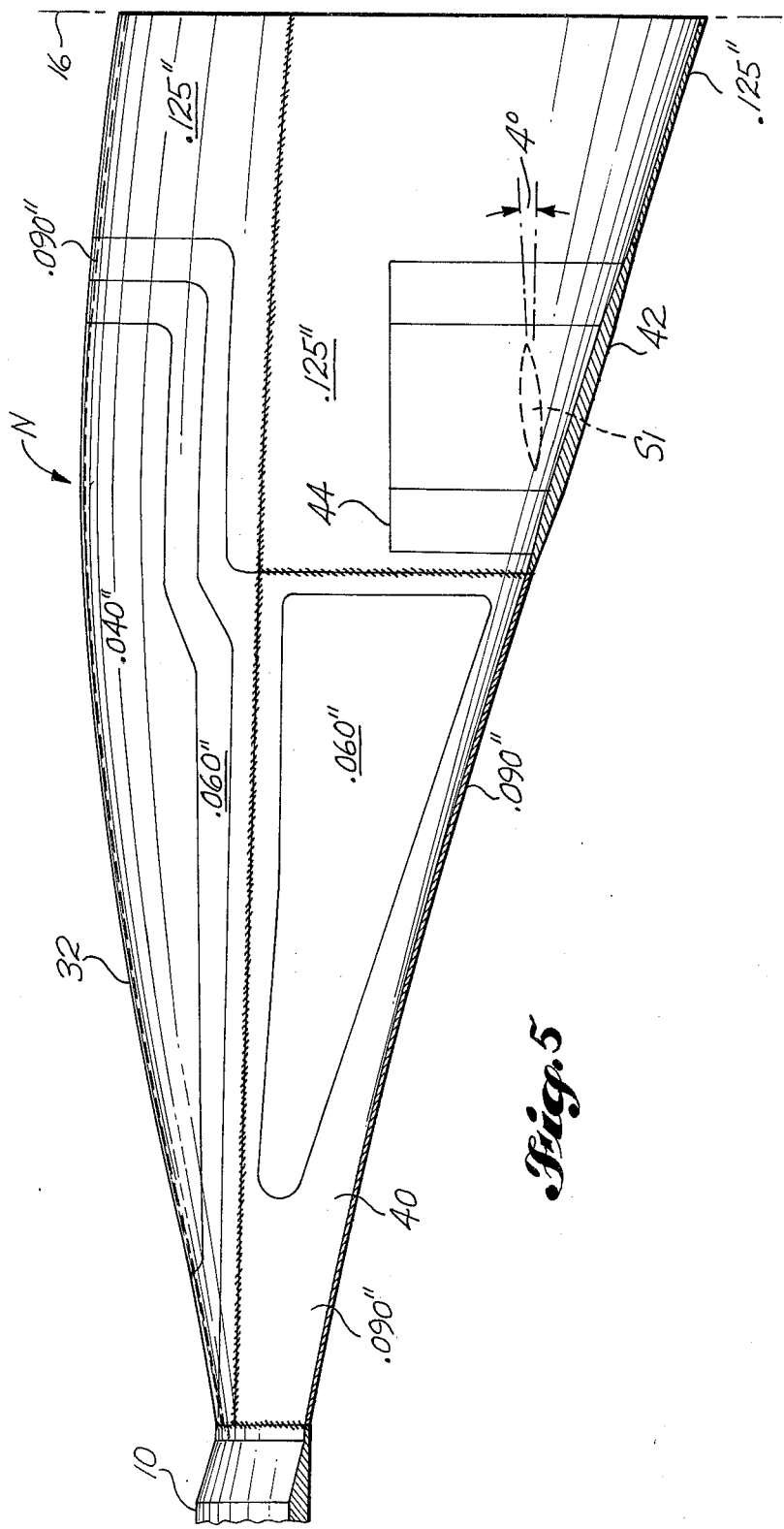
FIG. 5 is a longitudinal sectional view taken through the nozzle, substantially along line 5—5 of FIG. 4, such view showing weld joints, contour lines and chemically milled areas.

As best shown by FIG. 5, the struts S1-S6 are of streamlined form in cross section.

The completed ring structure R provides hoop strength at the center of the nozzle N, while placing only a minimal amount of structure (the six stream lined struts S1-S6) within the propulsion gas stream.

Figure 3:
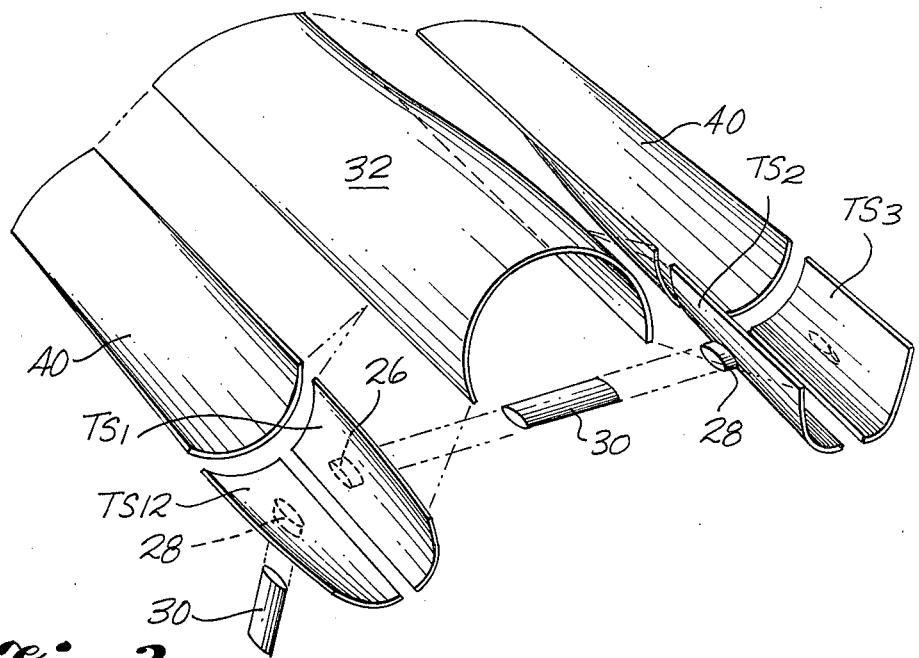
FIG. 3 is an exploded pictorial view of the parts which are combined together to form one complete lobe and the root portions of the two adjoining lobes, in a preferred embodiment of the invention.

Referring now to FIGS. 3, 5, and 6, each lobe comprises a crown section 32. The mixing section 14 of nozzle N is completed by six forward valley wall sections 40, each positioned between a pair of lobes, immediately forwardly of a pair of connected thickened sidewall sections, (e.g. TS11 and TS12 in FIG. 3).

Preferably, the shaped sheet metal sections 32, and 40 are initially formed to be of uniform thickness. The thickened sidewall sections TS1-TS12 are precision castings. The thickened portions 42 of the thickened sidewall sections TS1-TS12 are significantly thicker but taper down constantly to the thickness dimensions of members 32 and 40 at locations spaced inwardly of their edges, indicated by a broken line 44 in FIG. 5.

In the preferred embodiment, intermediate regions of the lobes are thinned, such as by chemical milling, to reduce the weight of the nozzle. All milling is done by design and is done in those regions which can stand to be thinner without causing a loss in necessary strength or stiffness in nozzle N. By way of typical and therefore non limitative example, the milled areas for the preferred embodiment, and their thickness dimensions, are shown in FIG. 5.

Weld lines are included in FIGS. 5 and 6 to show where welding together of the several components occurs. The welding is performed in accordance with well known aircraft construction techniques and the weld material is ground away to produce a smooth continuous surface across each weld joint.

Figure 8:
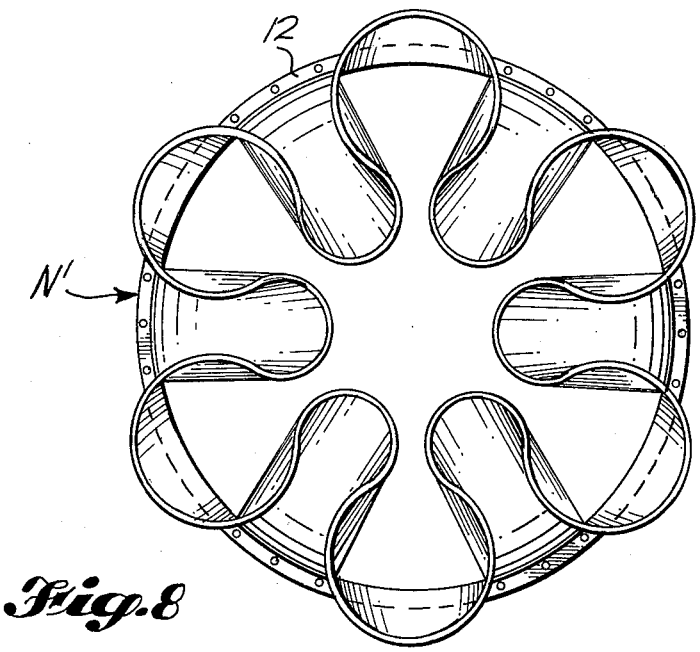
FIG. 8 is a rear elevational view like FIG. 2, but of a second embodiment having lobes which are circular in cross section.

FIG. 8 is a rear elevational view of a second embodiment of the nozzle, involving lobes of circular curvature in cross section merging into valleys of circular curvature and cross section. In other respects this nozzle is like the preferred embodiment shown by FIGS. 1-7. Accordingly, its composite construction, its ring structure, etc. will not be specifically described.

Both nozzles are characterized by lobe and valley regions which curve smoothly in the radial direction throughout their full extent. Both embodiments present valleys of concave curvature which open radially outwardly and lobes of radially outwardly directed convex curvature. In each embodiment, the curvature pattern, starting at a center line of a valley, involves a concave to convex ogee curvature change. In the preferred embodiment, shown by FIGS. 1-7, the general cross-sectional shape of the lobes proper is elliptical. In the embodiment of FIG. 8, the general cross-sectional shape of the lobes proper is circular. It was found that the fluid pressure forces acting on circular lobes that are restrained by a ring structure as shown in the embodiment tended to distort the lobes into an elliptical cross-sectional shape. Accordingly, it is believed that the elliptical cross-sectional shape provides the better design, from a stable shape standpoint.

The radially curved nature of the lobe sidewalls in both embodiments acts to hold the lobe shape and is at least a major contributer to holding deformation of the lobe walls within acceptable limits.

The combination of radially curved sidewalls, a single small internal strut per lobe, and thickened lobe sidewall sections, solved the performance loss problem associated with nozzles of the type shown by the aforementioned U.S. Pat. No. 3,092,205, attributable to pressure losses and pressure and temperature deflections of the lobes. A structural analysis of the preferred embodiment showed that deflections resulting from pressure and temperature at respective engine power settings changed the exit area approximately (one tenth of one percent) which is within the requirements established by the engine manufacturer. Performance loss was further minimized by aligning the internal struts with engine airflow (i.e. at an angle of about four degrees from horizontal, as shown by FIG. 5). Elimination of external struts in the valleys improved airflow in the valley passageways, providing increased accoustical attenuation and reduced aerodynamic drag.

It should be understood that the invention may be embodied to other specific forms without departing from the spirit or basic characteristics thereof. The illustrated embodiments, therefore are to be considered in all respects as illustrative and not restrictive and the invention is not to be limited to the details described heretofore but may be modified within the scope of the appended claims.

What is claimed is:

1. A noise suppressing nozzle comprising a plurality of lobes, each lobe defining an internal passageway for hot gases flowing through the nozzle, and each pair of adjacent lobes defining between them an external passageway for ambient air, and the improvement comprising:

each lobe including a thickened sidewall section on each of its sides, with each said thickened side wall section merging into and becoming an integral part of the adjacent thickened sidewall section of the adjoining lobe in a valley region between the lobes;

each lobe being internally reinforced by a single streamlined transverse strut, connected at its ends to the thickened sidewall sections of its lobe;

with the sidewalls of each lobe curving smoothly in the radial direction and from the vicinity of strut attachment to the thickened sidewall sections first diverging apart as they extend radially outwardly, and then converging together and eventually merging; and wherein the thickened sidewall sections of the lobes and the transverse struts define a ring which together with the radially curved sidewall configuration of the lobes act to adequately maintain nozzle shape and brace against exit area change without the need of additional reinforcing structure.

2. A noise suppressing nozzle according to claim 1, wherein the transverse reinforcing struts occupy a common radial plane spaced forwardly of the outlet plane of the nozzle.

3. A noise suppressing nozzle according to claim 1, wherein the nozzle comprises six lobes.

4. A noise suppressing nozzle according to claim 1, wherein each lobe has elliptical proportions in cross section.

5. A noise suppressing nozzle according to claim 4, wherein the nozzle comprises six lobes.

6. A noise suppressing nozzle according to claim 4, wherein the transverse reinforcing struts are positioned within the lobes at locations spaced axially forwardly of the nozzle outlet.

7. A noise suppressing nozzle according to claim 5, wherein the transverse reinforcing struts are positioned within the lobes at locations spaced axially forwardly of the nozzle outlet.

8. A noise suppressing nozzle according to claim 1, wherein each lobe has circular proportions.

9. A noise suppressing nozzle according to claim 1, wherein in addition to its two thickened sidewall sections, each lobe comprises a crown wall section, wherein the thickened sidewall section and the crown section are welded together where they meet, and wherein the nozzle further includes a forward valley wall section for each pair of lobes which is positioned axially forwardly of the thickened side wall sections for such lobes and radially inwardly of the crown wall sections for such lobes, and is welded to such thickened sidewall and crowned sections where it meets them.

10. A noise suppressing nozzle according to claim 1, wherein the crown wall sections and the forward valley sections are formed sheet metal members.

11. A noise suppressing nozzle according to claim 10, wherein portions of the formed sheet metal members are reduced in thickness by milling for the purpose of reducing the weight of the nozzle.

12. A noise suppressing nozzle according to claim 9, wherein a main body portion of each thickened sidewall section is thicker than the crown section and the forward valley wall section to which it is welded, and said thickened sidewall section tapers gradually in the forward, rearward and radially outward directions, so that it is substantially equal in thickness to the crown wall, and forward valley wall sections where it meets and is connected to them.

13. A noise suppressing nozzle according to claim 12, wherein each thickened sidewall section is formed to include a short stub end portion of the streamlined transverse strut, and said streamlined transverse strut further includes a central portion which is welded at its ends to the stub end portions.

14. A noise suppressing nozzle according to claim 1, wherein each thickened sidewall section is formed to include a short stub end portion of the streamlined transverse strut, and said streamlined transverse strut further includes a central portion which is welded at its ends to the stub end portions.

15. In a noise suppressing nozzle of the multi-lobe type, a ring structure for reinforcing a center region of the nozzle, comprising:

thickened sidewall sections of the lobes, each of which merges into and is welded to an adjacent thickened sidewall section of an adjoining lobe, and a single streamlined strut within each lobe, structurally interconnected between the thickened sidewall sections of the lobe.

16. A noise suppressing nozzle which includes the ring structure of claim 15, comprising six lobes.

17. A noise suppressing nozzle which includes the ring structure of claim 15, comprising lobes having sidewalls which curve smoothly in the radial direction and which first diverge apart as they extend radially outwardly from the general vicinity of strut attachment, and then converge together and eventually merge.

18. A noise suppressing nozzle according to claim 17, wherein each lobe is generally elliptical in cross section.

19. A noise suppressing nozzle according to claim 18, comprising six lobes.

20. A noise suppressing nozzle according to claim 18, wherein each lobe is generally circular in cross section.

21. A noise suppressing nozzle according to claim 20, comprising six lobes.

22. A noise suppressing nozzle which includes the ring structure of claim 15, wherein the streamlined struts occupy a common plane which is spaced forwardly of the exit plane of the nozzle.

23. A noise suppressing nozzle comprising six lobes, each lobe defining an internal passageway for hot gases flowing through the nozzle, and each pair of adjacent lobes defining between them an external passageway for ambient air, and the improvement comprising:

each lobe having sidewalls which curve smoothly in the radial direction and which undergo an ogee transformation in curvature from a radially outwardly directed concave curvature in the regions between lobes to a radially outwardly directed convex curvature at the radial outer extents of the lobes, and a single transverse strut within each lobe extending between sidewall portions of the lobe, for structurally reinforcing the base of the lobe.

24. A noise suppressing nozzle according to claim 22, wherein each lobe is generally elliptical in cross section.

25. A noise suppressing nozzle according to claim 22, wherein each lobe is generally circular in cross section.

26. A noise suppressing nozzle according to claim 23, wherein each said lobe comprises a pair of thickened sidewall sections, one on each side of the lobe, with each thickened sidewall section being a mirror image of the other, wherein the single strut for each lobe is interconnected between said thickened sidewall sections, and wherein said thickened sidewall sections taper towards, and are smoothly incorporated into, the remaining wall portions of the lobes.

* * * * *